Aug. 4, 1970  R. G. KRAMER  3,522,414
HIGH SPEED BROILING OVEN WITH A PIVOTAL ELECTRIC
BROILING ELEMENT
Filed Oct. 17, 1968  2 Sheets-Sheet 1

INVENTOR.
ROBERT G. KRAMER
BY Richard L. Caslin
HIS ATTORNEY

3,522,414
HIGH SPEED BROILING OVEN WITH A PIVOTAL ELECTRIC BROILING ELEMENT
Robert G. Kramer, Louisville, Ky., assignor to General Electric Company, a corporation of New York
Filed Oct. 17, 1968, Ser. No. 768,308
Int. Cl. F27d 11/02
U.S. Cl. 219—404      3 Claims

ABSTRACT OF THE DISCLOSURE

A broiling oven having walls forming an oven cooking cavity. There are electrical resistance heating elements for the oven, including an upper broiling element adjacent the top wall of the oven liner and a lower broiling element located intermediate the top and bottom walls of the oven liner. A food supporting rack is located between the two broiling elements. The lower broiling element includes hinging means whereby the lower element may be stored in an inoperative position against one wall of the oven liner when not in use.

CROSS-REFERENCE TO RELATED PATENTS

The present invention is an improvement over the tiltable heating elements for a broiling oven as is taught in the patent of F. E. Mergen, No. 2,848,592, which is also assigned to the General Electric Company, the assignee of the present invention. In the Mergen invention, the heating units may be tilted toward the food for broiling and they may be moved back adjacent the walls of the oven liner for normal baking operations, but they are illustrated as dual hinged heating elements which are non-standard.

Another prior art patent is that of E. H. Filipak, No. 3,270,660 which teaches a high speed broiling oven where there is a standard top broiling element and a plug-in lower broiler element that is located intermediate the top and bottom walls of the oven liner. This lower broiling element may be positioned in the bottom of the oven for baking as in standard ovens, or it could be a third heating element in addition to the standard baking and broiling heating elements.

BACKGROUND OF THE INVENTION

This invention is related to broiling ovens and particularly electric broiling ovens having a standard broiling element located adjacent the top wall of the oven liner, and an additional lower broiling element disposed intermediate the top and bottom walls of the oven liner. There is a food supporting rack located between the upper and lower broiling elements so that the food may be heated faster by supplying heat from both the top and bottom at the same time. In a standard electric oven broiling has been accomplished by using an upper heating element alone that would be energized at full wattage at about 3,000 or 3,600 watts. Unfortunately, the time necessary to obtain the desired condition of "doneness" in a broiling operation remains unduly long because the food has to be turned over so that it may be broiled on both sides. Broiling is performed by radiant heat when the heating element operates continuously at its maximum temperature. The distance from the radiant heat source to the food is of course an important factor in the speed of broiling.

Admittedly, the speed of broiling can be increased if two sources of radiant heat are provided so that both sides of the food can be broiled at the same time. One problem arises as to what to do with the additional broil element when the oven is to be used for normal baking operations when a bottom baking element is to be energized at full wattage and the upper broiling element is to be energized at reduced wattage for top browning. Such an additional broiling element or third heating element is large in size in that it extends over an area only slightly less than the area of the bottom wall of the oven liner. Such a large device would be bothersome to store in a kitchen cabinet or the utensil drawer beneath the oven or in the kitchen pantry.

The principal object of the present invention is to provide a broiling oven with both top and bottom heating means for broiling, where a lower broiling element may be stored in an operative position against one wall of the oven liner.

A further object of the present invention is to provide a broiling oven with dual broiling elements, where the lower broiling element has a novel hinging arrangement so that the lower element may be stored in an inconspicuous position against the back wall of the oven liner.

A further object of the present invention is to provide a high speed broiling oven with a slidable food supporting rack having both over and under heat sources, and a slidable pan-supporting rack beneath the lower heat source and, an interconnecting means between the two racks so that they may be moved in unison and the pan of the lower rack will catch the drippings from the food on the upper rack.

SUMMARY OF THE INVENTION

The present invention, in accordance with one form thereof, relates to a broiling oven having an oven cavity provided with electrical resistance heating means including an upper broiling element adjacent a top wall of the oven and a lower broiling element intermediate the top and bottom walls of the oven. A food supporting rack is disposed between the two broiling elements. The lower broiling element includes hinging means whereby the lower element may be stored in an inoperative position against one wall of the oven when not in use.

BRIEF DESCRIPTION OF THE DRAWINGS

My invention will be better understood from the following description taken in conjunction with the accompanying drawings, and its scope will be pointed out in the appended claims.

DESCRIPTION OF THE PREFERRED EMBODIMENT

Figures 1, 4:
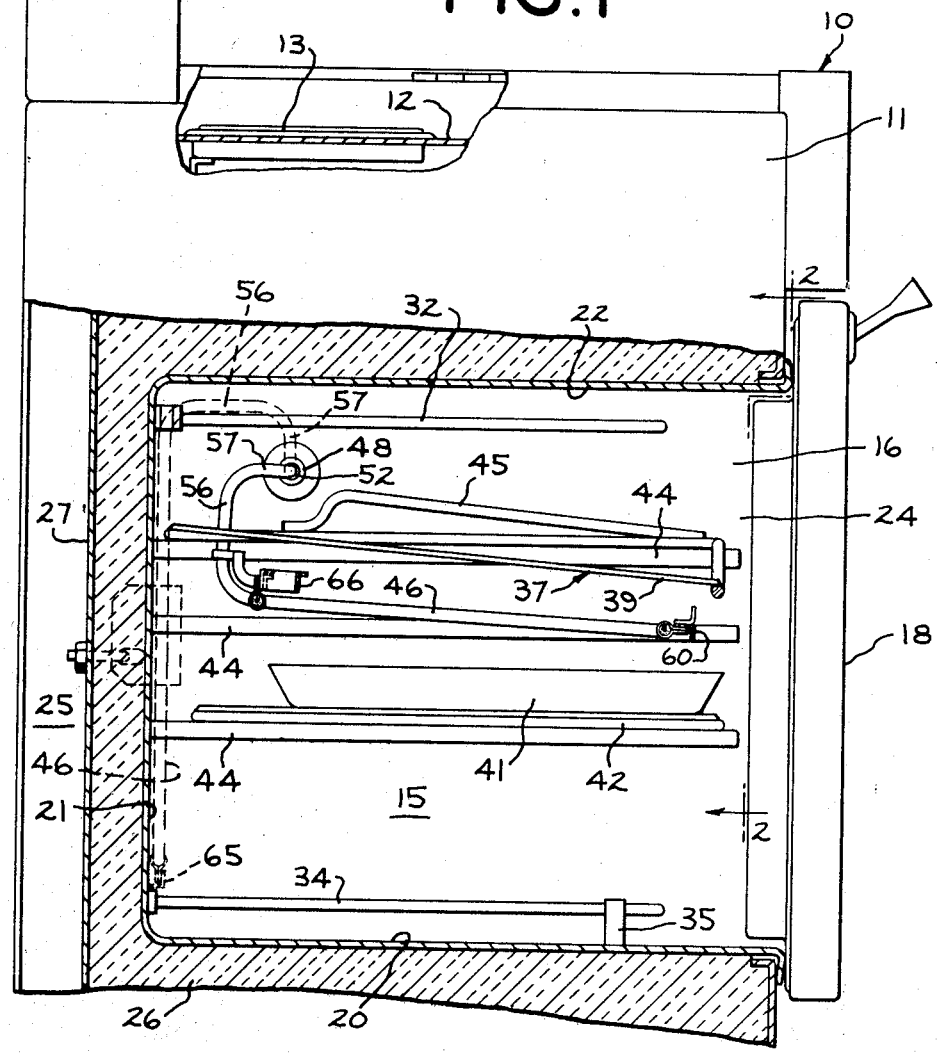
FIG. 1 is a fragmentary left-side elevational view of an electric range having a baking and broiling oven embodying the present invention, with some parts broken away and others in cross-section to show the principal features.
FIG. 4 is a fragmentary view showing the detail of a removable connecting means joining the food supporting rack with the lower pan supporting rack whereby the two racks may be moved in unison.

Turning now to a consideration of the drawings and in particular to FIG. 1 there is shown for illustrative purposes a free-standing electric range 10 having conventional body construction in which the outer cabinet 11 has a top cooking surface 12 with a plurality of surface heating elements 13. The range cabinet further includes an oven cavity 15 below the cooking surface and formed by a box-like oven liner 16 and a front-opening access door 18. The oven liner has a bottom wall 20, back wall 21, top wall 22 and opposite side walls 24. A thick layer of thermal insulating material 26 such as fiberglass or the like surrounds the outside of the oven liner to retain the heat generated therein. A panel-like insulation guard 27 engages the insulation at the back of the oven and serves to establish a wiring chamber 25 for making connection between the incoming power cable and the various electrical components of the range as is standard in this art. The back edge of the cooktop 12 supports a backsplasher 28 having a control panel 29 carried thereby with the necessary control components 30 for both the surface heating element 13 and the oven heating elements.

The oven has a standard broil element 32 located adjacent the top wall 22 of the oven liner and a standard baking element 34 located adjacent the bottom wall 20 of the oven liner. The front portion of the bake element 34 is supported from the bottom wall 20 of the oven liner by a clip member 35 that is fastened to the bake element and rests on the bottom wall. Each bake element 34 and broil element 32 is a metal sheathed resistance heating element of looped configuration which has terminal ends which are either formed as a plug-in terminal block or which extend through the back wall 21 of the oven liner for making electrical connection outside of the oven cavity with lead wires (not shown) of the power circuit.

Figure 3:
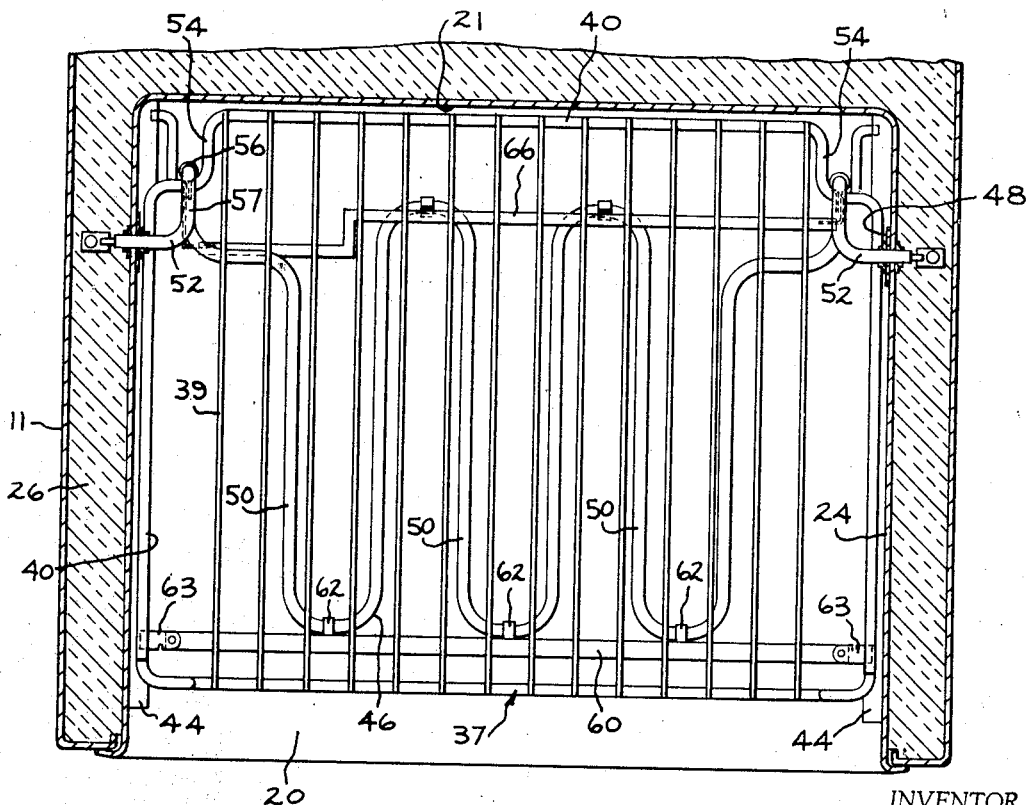
FIG. 3 is a fragmentary cross-sectional plan view taken on the line 3—3 of FIG. 2 and showing the interrelation between the food supporting rack and the lower broiling element.

A slidable food supporting rack 37 is disposed closely beneath the upper broiling element 32. This rack 37 is not shown as a standard, horizontal oven rack but instead it has a forwardly and downwardly slanting series of wire rods 39 which are arranged in parallel and bounded by a heavy wire frame 40, as is best seen in the top plan view of FIG. 3. The purpose of the slanting rack 37 is to keep smoke to a minimum during the broiling operation by having the rack retain much of the grease drippings from the food and cause the drippings to move down toward the front of the rack where they are allowed to fall into a lower pan 41 that is supported on a second oven rack 42. The food supporting rack 37 is carried at its two sides by a ledge or rack support 44 formed on each side wall 24 of the oven liner. Actually there are three levels of rack supports 44 to permit the user to choose a variety of rack positions. Slanting rails 45 are fixed to the top side of the side portions of the heavy wire frame 40 to be generally parallel to the slanting wire rods 39 so that the rack 37 may be reversible and in its reversed position serve as a standard oven rack.

A second broiling element 46 is positioned closely beneath the food supporting rack 37 so that food on the rack may be heated simultaneously by the upper broiling element 32 and the lower broiling element 46. This lower broiling element 46 differs from the upper broiling element 32 in that it is a hinged or pivoted member, there being a journal bearing 48 arranged in each side wall 24 of the oven liner for the element 46 above the food supporting rack 37 and closely spaced both from the back wall 21 and the top wall 22 of the oven liner. Comparing both FIGS. 1 and 3 the lower broiling element 46 is a metal sheathed resistance heating element of serpentine shape having a series of three loops 50 which terminates in a pair of trunnions 52 that are disposed in a common pivotal axis, which trunnions are supported in the journal bearings 48. Notice in the top plan view of FIG. 3 that the two rear corners of the wire frame 40 of the food supporting rack 37 are notched as at 54. These notched portions 54 allow space for the extension of the terminals of the lower broiling element 46 from beneath the food supporting rack 37 in an upward direction as at 56 in FIG. 1 and then in a forward direction at 57 and terminating in an outward direction as the trunnions 52. With this arrangement, and viewing the element 46 in its horizontal or heating position as shown in FIG. 1, the pivot or hinge points for the element are spaced above the plane of the heating loops 50 and generally in line or slightly forwardly of the rear ends of the loops. The reason for such an intricate hinging configuration is that it is preferred that the lower broiling element 46 should have a large heating area extending from nearly the front to the back of the oven, while at the same time being hinged in such a manner that it is capable of being stored against the back wall 21 of the oven liner, as seen in dotted lines in FIG. 1.

Figure 2:
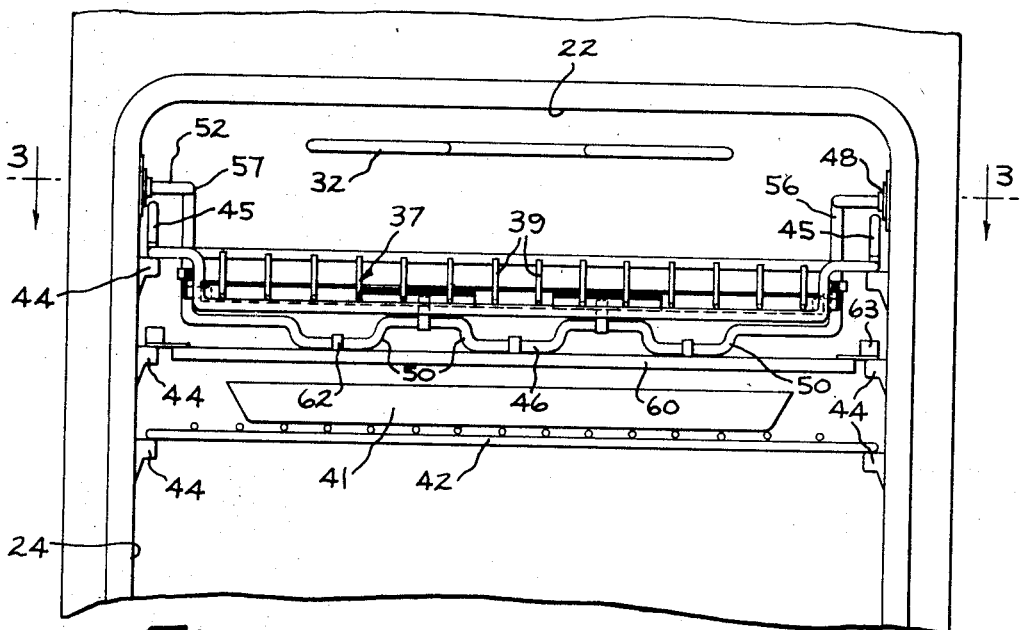
FIG. 2 is a fragmentary front elevational view looking into the top portion of the oven and taken on the line 2—2 of FIG. 1 and showing a top broiling element, a front slanting food supporting rack beneath the top element, a lower broiling element beneath the food rack, and a pan supporting rack beneath the lower broiling element.

Some means must be provided for supporting the lower broiling element 46 in its operative position beneath the food supporting rack 37. This supporting means can best be visualized in FIG. 3 where there is shown a connecting bar 60 extending from side to side of the oven and attached to the front of the three loops 50 of the lower broiling element 46, as by clip members 62. Thus the connecting bar 60 serves as a reinforcing member between the three loops of the element and it also has formed on each of its opposite ends a pivotal tab 63 which in its extended position is able to overlie a rack supporting ledge 44 of the side walls of the oven liner, as can be seen in FIG. 2. Thus when the lower broiling element 46 is to be placed in its stored or inoperative position against the back wall 21 of the oven liner, the pivoted tabs 63 are first disengaged from the ledges 44 from the side walls of the oven liner and then the element 46 is lowered and then pushed against the back wall 21 of the oven liner. The element 46 is held in place by again using the pivoted tabs 63 for interengagement with a fastening element 65 supported on the back wall 21 of the oven liner adjacent the bottom thereof, as is best seen in FIG. 1.

A second reinforcing bar 66 is connected across the loops 50 at the back of the element 46 to prevent the sagging of the element in that area.

A pan supporting rack 42 is positioned beneath the lower broiling element 46 and is supported on ledges 44 formed on the side walls 24 of the oven liner. A large shallow pan 41 is placed on the rack 42 and is positioned toward the front of the oven to catch the drippings from the front edge of the food supporting rack 37. Of course, the pan supporting rack 42 and pan 41 must be removed from the oven before the lower broiling element 46 may be shifted from its operative position of FIG. 1 to its inoperative position shown in dotted lines of FIG. 1 against the back wall 21 of the oven liner. A releasable connecting means 70 may be used to join the two racks 37 and 42 as at each side of the oven so that sliding movement of one rack will effect parallel movement of the other rack so that the pan 41 always remains under the broiling rack 37. Screw members 71 may fasten the connecting means 70 to a fixed clip member 72 encircling the heavy wire frame of each rack respectively.

Modifications of this invention will occur to those skilled in this art. Therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. A high speed broiling oven comprising insulated walls forming a box-like oven liner with a bottom wall, opposite side walls, a rear wall, a top wall and a front-opening access door, electrical resistance heating means for the oven including a fixed upper broiling element located adjacent the top wall of the oven liner and a pivotal lower broiling element located intermediate the top and bottom walls of the oven liner, the lower heating element having terminal hinge means arranged as trunnions beneath the upper element and extending through suitable bearings formed in the two opposite side walls of the oven liner adjacent the top rear corners thereof, whereby the lower element may be stored against the rear wall of the oven liner when not in use, an adjustable supporting means for holding the lower broiling element in its intermediate and operative position, a food supporting rack located between the upper and lower heating elements and supported from the side walls of the oven liner so that food placed on the rack may be heated by radiant energy from both heating elements when the elements are energized simultaneously.

2. A high speed broiling oven as recited in claim 1 wherein the said adjustable supporting means is in the form of a pivotal tab that cooperates between each side wall of the oven liner and the lower heating element.

3. A high speed broiling oven as recited in claim 2 with a pan supporting rack located beneath the lower heating element and supported from the side walls of the oven liner, and releasable connecting means fastened between both the food supporting rack and the said pan supporting rack whereby they may be moved in unison so that a pan on the lower rack will catch the drippings from the food on the upper rack.

References Cited

UNITED STATES PATENTS

| | | | |
|---|---|---|---|
| 2,767,298 | 10/1956 | Fry | 219—403 X |
| 2,848,592 | 8/1958 | Mergen | 219—404 |
| 2,984,730 | 5/1961 | Ostrom et al. | 219—404 |
| 3,076,886 | 2/1963 | Altman et al. | 219—404 |
| 3,086,102 | 4/1963 | Meyers | 219—404 |
| 3,270,660 | 9/1966 | Filipak | 219—403 X |
| 3,281,575 | 10/1966 | Ferguson | 219—404 |

FOREIGN PATENTS 858,174  1/1961  Great Britain.

VOLODYMYR Y. MAYEWSKY, Primary Examiner

U.S. Cl. X.R.

219—395